(12) United States Patent
Koschany

(10) Patent No.: US 7,318,976 B2
(45) Date of Patent: Jan. 15, 2008

(54) ELECTRODES WITH ADJUSTABLE GAS PERMEABILITY, AND METHOD OF PRODUCING SUCH ELECTRODES

(75) Inventor: Petra Koschany, Salzweg (DE)

(73) Assignee: Manhattan Scientifics, Inc., New York, NY (US)

( * ) Notice: Subject to any disclaimer, the term of this patent is extended or adjusted under 35 U.S.C. 154(b) by 671 days.

(21) Appl. No.: 10/317,223

(22) Filed: Dec. 12, 2002

(65) Prior Publication Data

US 2003/0138689 A1  Jul. 24, 2003

(30) Foreign Application Priority Data

Dec. 14, 2001  (DE)  ................. 101 61 605

(51) Int. Cl.
*H01M 4/86* (2006.01)
*H01M 4/88* (2006.01)
*H01M 4/96* (2006.01)

(52) U.S. Cl. ................. 429/40; 429/44; 502/101
(58) Field of Classification Search ............... None
See application file for complete search history.

(56) References Cited

U.S. PATENT DOCUMENTS 4,248,682 A  2/1981  Lindstrom et al.
6,159,533 A  12/2000  Dearnaley et al.
6,413,663 B1 *  7/2002  Mercuri ................. 429/30

FOREIGN PATENT DOCUMENTS

| GB | 1260851 | 1/1972 |
| WO | WO 01/54213 | 7/2001 |
| WO | WO 02/43177 | 5/2002 |

* cited by examiner

Primary Examiner—Jonathan Crepeau
(74) Attorney, Agent, or Firm—James Creighton Wray; Clifford D. Hyra

(57) ABSTRACT

An electrode with adjustable gas permeability for electrochemical cells is formed by first and second laminated thin layers. The first serves for determining the overall gas permeability through the thickness of the electrode and conducting electricity. The second is for conducting electricity, supplying the reaction gases and removing the reaction products, and is a porous electricity-conducting material. The laminate consists of at least two materials of different gas permeability. The material with the higher gas permeability located on the side of the membrane forms the first layer, and the material with the lower gas permeability forms the second layer on the side away from the membrane. Openings are formed in the laminate towards the side adjacent to the membrane. The sidewalls of the openings in the area of the material with the higher gas permeability are at least partially covered by the material with the lower gas permeability.

10 Claims, 4 Drawing Sheets

ELECTRODES WITH ADJUSTABLE GAS PERMEABILITY, AND METHOD OF PRODUCING SUCH ELECTRODES

This application claims the benefit of German Application No. 101 61 605.8 filed Dec. 14, 2001.

BACKGROUND OF THE INVENTION

The present invention relates to electrodes for electrochemical cells, which electrodes exhibit a certain gas permeability for supplying the reaction gases and due to which a uniform distribution of the reaction gases over the entire contact surface to the electrolyte becomes possible.

Electrochemical cells consist of an anode side electrode and a cathode side electrode which serve for making the electric contact, however also for supplying and carrying away the educts and products of the electrochemical reaction. They further consist of an electrolyte situated between the electrodes.

An example for such an electrochemical cell is a polymer electrolyte membrane (PEM) fuel cell. In this case a membrane made of a proton-conducting polymer is used as electrolyte. On both sides of the membrane, either on the membrane itself or on the adjacent gas diffusion electrodes, there is a porous layer which contains the catalysts necessary for the electrochemical reaction. Then, on both sides, there are the so-called gas diffusion electrodes, which serve for supplying the reaction gases hydrogen and air. At the anode side the hydrogen supplied is split into protons and electrons at the catalyst. The protons move through the polymer electrolyte membrane to the cathode side of the fuel cell where they react with the oxygen from the air to form water. The electrons needed for this are supplied from the anode via an external circuit to the cathode. In this circuit they can do electric work.

Document WO 01/54213 describes the use of films made of pressed expanded graphite with so-called gas channels as electrodes in electrochemical cells. These gas channels are uninterrupted openings from one side of the graphite film to the other. They are necessary since a closed film of pressed expanded graphite exhibits only a very low gas permeability so that without these openings it would not be possible to supply a sufficient amount of reaction gases to the catalyst and to the membrane. This document describes electrodes with two plane, parallel surfaces, having such shape even after the openings in the graphite film are formed. In particular, the side towards the membrane or towards the catalyst layer on the membrane, respectively, is plane and does not have any projecting parts or the like. Therefore, the graphite film of the electrodes is everywhere in direct contact with the catalyst layer, with the exception of those areas where one of the openings is in the electrode. However, there is hardly any gas diffusion, from the openings of the electrode, parallel to the membrane, since although the catalyst layer is porous, it is also very thin. This means that hardly any reaction gases can reach those parts of the catalyzed membrane which are covered by the electrode. Thus, the disadvantage of the described electrode is that only a very small part of the available membrane area is actually used, which leads to significant losses of power e.g. in a fuel cell.

SUMMARY OF THE INVENTION

The object underlying the present invention is to provide electrodes for electrochemical cells, whose gas permeability can be pre-set by means of a simple and inexpensive production process and which present an optimal distribution of the reaction gases parallel to the membrane.

This object is achieved by an electrode for an electrochemical cell, which electrode is characterized in that the first layer of the first material(s) having a lower gas permeability exhibits openings which penetrate into the other layer of the second material(s) having a higher gas permeability, and the first material extends along the inner wall surfaces of the openings to some extent into the second layer. In short, the electrode consists of at least two materials of different gas permeability wherein one material or composition of materials exhibits openings, penetrates into the other material or composition of materials in the zone around these openings and thus produces indentations, or notches the latter. The openings can be blind holes or through holes. Such electrode can according to the invention be produced, starting out from a laminate of first and second layers of the first material(s) and the second material(s), respectively, by exerting a mechanical pressure onto spots of the layer of the first material(s) from its side located away from the second material(s) so that the first material(s) tear(s) at the locations of the spots to create indentations which form openings passing through the layer of the first material(s) and penetrating into the layer of the second material(s), parts of the torn first material(s) being pressed into the layer of the second material(s) and adhered to the walls of the openings.

Preferably, the electrode is characterized in that due to the penetrating of the first material(s) into the second material(s) an interlocking occurs between all these materials so that the materials are mechanically bonded or bonded by a bonding agent, and that the first material(s) has/have a considerably lower gas permeability than the second material(s).

In the electrode which is formed by the first and second laminated thin layers, the first layer mainly serves for determining the overall gas permeability through the thickness of the electrode and for conducting electricity, and the second layer which is to be arranged adjacent to a membrane of the cell does not only serve for conducting electricity but also for supplying the reaction gases and removing the reaction products in parallel to the membrane surface. The layers consist of at least two electricity-conducting materials of different gas permeability which substantially are located surface to surface, wherein the material with the higher gas permeability is to be located on the side of the membrane and forms the first layer, and the material with the lower gas permeability forms the second layer to be located on the side away from the membrane. From this side, the openings are formed in or through the laminate towards the side adjacent to the membrane, and the sidewalls of the openings in the area of the material with the higher gas permeability are still at least partially covered by the material with the lower gas permeability which penetrates into this material layer.

Preferred embodiments of the invention can be taken from the respective dependent claims.

Further details, advantages and improvements of the invention can be taken from the subsequent description of embodiments, where reference is made to the drawings.

BRIEF DESCRIPTION OF THE DRAWINGS

FIG. 3 is a perspective view of a part of a still further embodiment of the electrode, where the openings in the materials do not pass through.

DETAILED DESCRIPTION OF THE PREFERRED EMBODIMENTS

Figure 1:
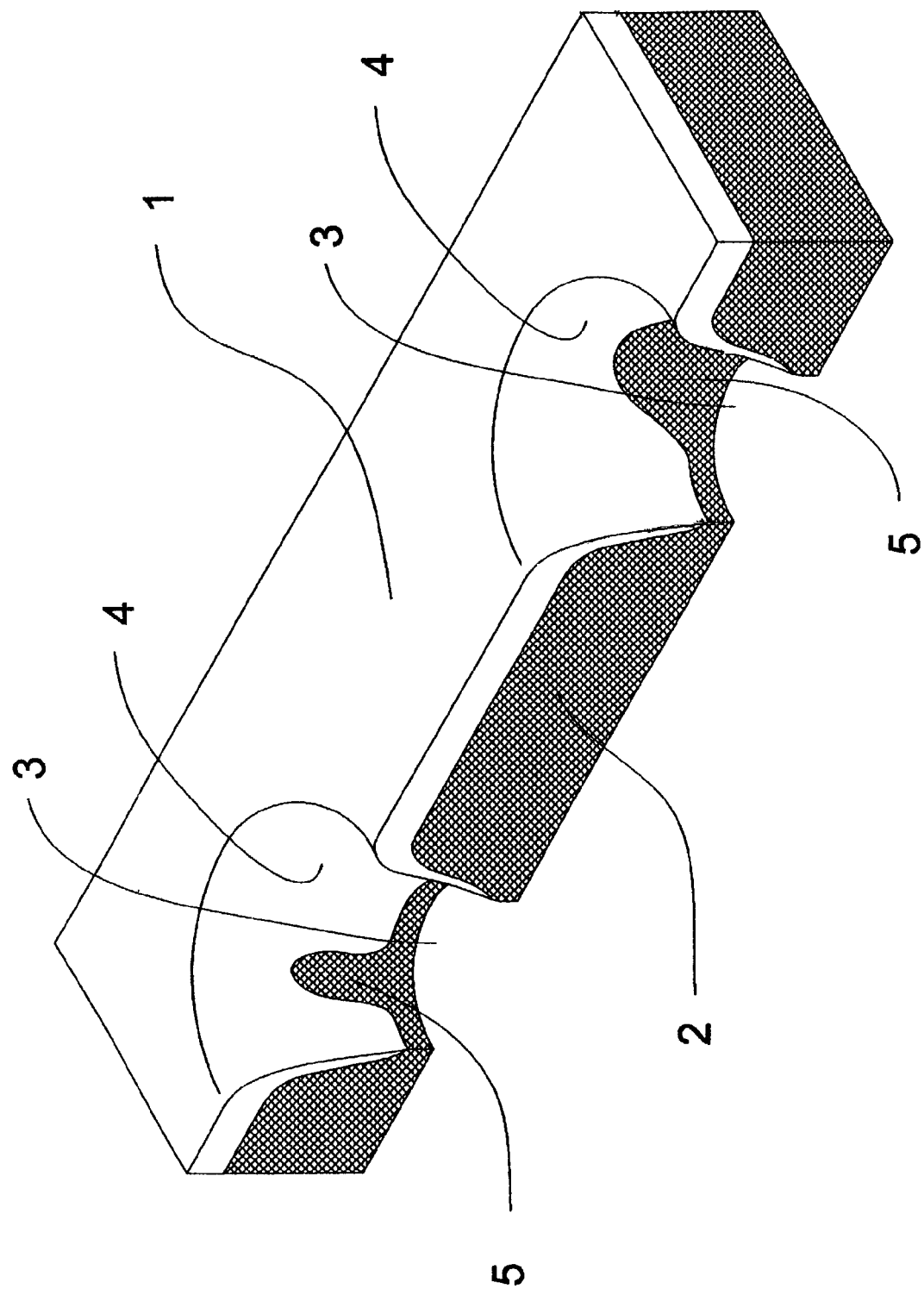
FIG. 1 is a perspective view of a part of an electrode, partially in section, where the (single) material with a lower gas permeability penetrates in a funnel-shape into the (composite) materials with higher gas permeability.

An electrode for an electrochemical cell, according to FIG. 1, consists of a laminate of two layers consisting of at least two materials 1 and 2 having different gas permeability. Material 1 has a lower and preferably considerably lower gas permeability than the materials 2 which are here supposed to be composed of different materials. In the preferred embodiment, materials 2 are a porous composition. Material 1 has holes or openings 3 which penetrate, together with some parts of material 1 in the zone around these openings, into the materials 2.

The materials 1 and 2 are electrically conducting materials and can be deformed mechanically. Material 1 serves for determining the gas permeability of the whole electrode towards the membrane, and the materials 2 which in the assembled electrochemical cell are located on the side of the electrode adjacent to the electrolyte membrane serve for distributing the reaction gases parallelly to the electrolyte, after the reactants have passed holes or openings 3 in the material 1. The porous materials 2 do not noticeably hinder the diffusion of the reaction gases so that the reaction gases are evenly distributed, parallelly to the membrane area, over the whole surface of the membrane. Thus, due to this electrode the entire surface area of the membrane can be utilized. This is also the case if, in order to achieve an overall lower gas permeability towards the membrane, there are only a relatively few openings 3 in the electrode.

For the material 1, preferably expanded graphite or metal is used, and in particular, metal foils or films of pressed expanded graphite are used. In the latter case the electric and thermal conductances of the electrode are increased by the creation of the openings 3 in the material 1. The graphite film penetrates into the materials 2 in such a way that around the openings 3 the graphite layer is located perpendicularly to the electrode plane. Since pressed expanded graphite has substantially higher electric and thermal conductivities perpendicularly to the layer normal, this results in a higher degree of conductance of the electrode as a whole perpendicularly to its plane.

For the materials 2, preferably carbon fiber materials and in particular fleece, felt or paper of carbon fibers, possibly provided with suitable binders or soot-filled so as to increase the conductivity, are used.

Substantially it is only through the openings 3 in the material 1 that the reaction gases can diffuse to the membrane or electrolyte of the electrochemical cell, so that the overall gas permeability of the electrode can be pre-set by the size of the openings 3 and their distance from each other. This means that the amount of the reaction gases diffusing through the openings 3 can be controlled in this way.

An even geometric distribution of the individual openings 3 over the entire electrode surface results in a uniform gas permeability of the entire electrode. By varying the geometric distribution of the openings 3 a gas permeability of the electrode which varies over its surface can be achieved. For example, this can be used at the cathode of a fuel cell if only a stoichiometric amount of air is supplied to it. Then, the amount of oxygen in the air on the way along the membrane surface decreases on the way from the air inlet to the air outlet since the oxygen is used up at the membrane due to the electrochemical reaction. In order to achieve an even reaction over the whole membrane surface, the gas permeability of the electrode is made lower in the area of the air inlet by means of a lower density of the openings 3 number of openings per surface unit area of the electrode while in the area of the outlet the gas permeability is higher due to a higher density of the openings. This has also a positive effect on the water balance of such a fuel cell. Since around the inlet the relatively cold atmospheric air comes in, a particularly large amount of vapour is taken up from the membrane by the air flow. While the air passes through the fuel cell it heats up so that at the air outlet it can take up only a rather small amount of vapour. The danger arises that the membrane dries out at the air inlet and is flooded at the air outlet. Due to the low gas permeability of the electrode at the inlet less vapour can diffuse into the air flow so that in this area the membrane remains sufficiently moist. At the outlet, more vapour can be absorbed by the air flow which is not yet saturated so high, so that a flooding of the membrane is avoided.

The geometric shape of the openings 3 in the material 1 can be freely chosen. Preferably, on the surface of the material 1 it is more or less circular. Along the circumferences of these circles a rotationally symmetrical, preferably conical or funnel-shaped geometric shape 4 is obtained as a result of the creation of the openings 3 and the resulting penetrating of the material 1 into the materials 2. This means that the penetrating material 1 protrudes in a funnel-shape into the materials 2 (cf. FIG. 1).

In a further preferred embodiment the geometric shape of the openings 3 is closely similar to lines on the surface of the material 1. As a result of such a forming of the openings 3 and the resulting penetrating of the material 1 into the materials 2, a shape 7 forms along the edges of these lines which shape, in a cross-section perpendicular to the length of the line, extends towards the bottom approximately in a trapezoid-shape (cf. FIG. 2), opening along an irregular bottom line.

Due to the penetrating of the material 1 into the materials 2 and the resulting funnels 4 or shapes 7, respectively, adhesion occurs between the materials. This adhesion is even increased by the frayed out, open lower ends of the funnels 4 or shapes 7, respectively, which notch the materials 2. The result is an interlocking of the materials 1 and 2, i.e. a mechanical bond.

Preferably, the depth of the funnels 4 or shapes 7, respectively, of material 1 is at least twice as large as the thickness of this material 1. The overall thickness of the materials 2 is preferably chosen larger than the depth of the funnels 4 or shapes 7, respectively, of material 1, said depth depending on the size of the individual openings 3. Thus, it is possible that the reaction gases which are supplied along the surface of the material 1 can diffuse from the funnels 4 into the materials 2. Additionally, when making the openings 3, gaps or cracks 5 in the walls of the funnels 4 might be produced. The reaction gases can diffuse into the materials 2 trough these cracks 5 as well.

The largest diameter of the funnels 4 or the largest width of the shapes 7 is preferably in the range between 0.1 and 1 mm.

The more or less circular openings 3 in the material 1 are produced mechanically, for example, by pressing needles or pins into this material 1 from the side away from the materials 2, forming indentations or through-holes in the laminate. At this instant, the material 1 is pressed into the materials 2 before the material 1 tears whereby the above-mentioned funnel-shaped forms 4 are obtained. The depth of the funnels 4 depends on the kind and diameter of the needles or pins and on the depth of indentation.

Figure 2:
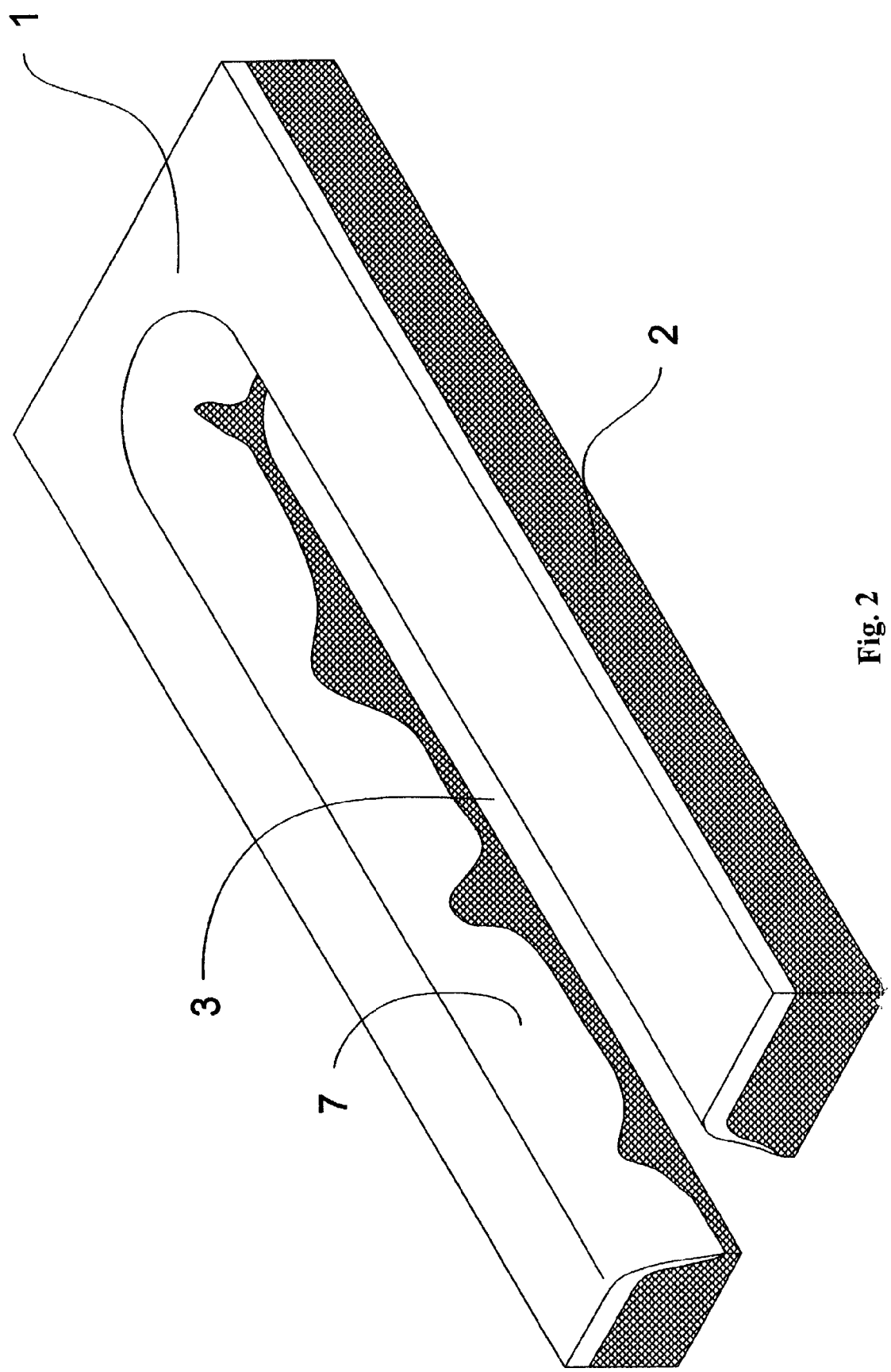
FIG. 2 is a perspective view of a part of another embodiment of the electrode, where openings in the materials are line-shaped.

The more or less line-shaped openings 3 of FIG. 2 are produced with the help of straight metal blades or metal platelets, for example. These blades or platelets can be drawn over the material 1 so that sort of a cut is produced in this material, which cut has the above-described shape 7, or they can be pressed through the material 1 from the side away from the materials 2 so that they notch the material 2 and press the material 1 into it, producing the described shape 7. Also in this case the depth of the shapes 7 depends on the width of the blades or on the cross section of the platelets and their depth of indentation.

Figure 3:
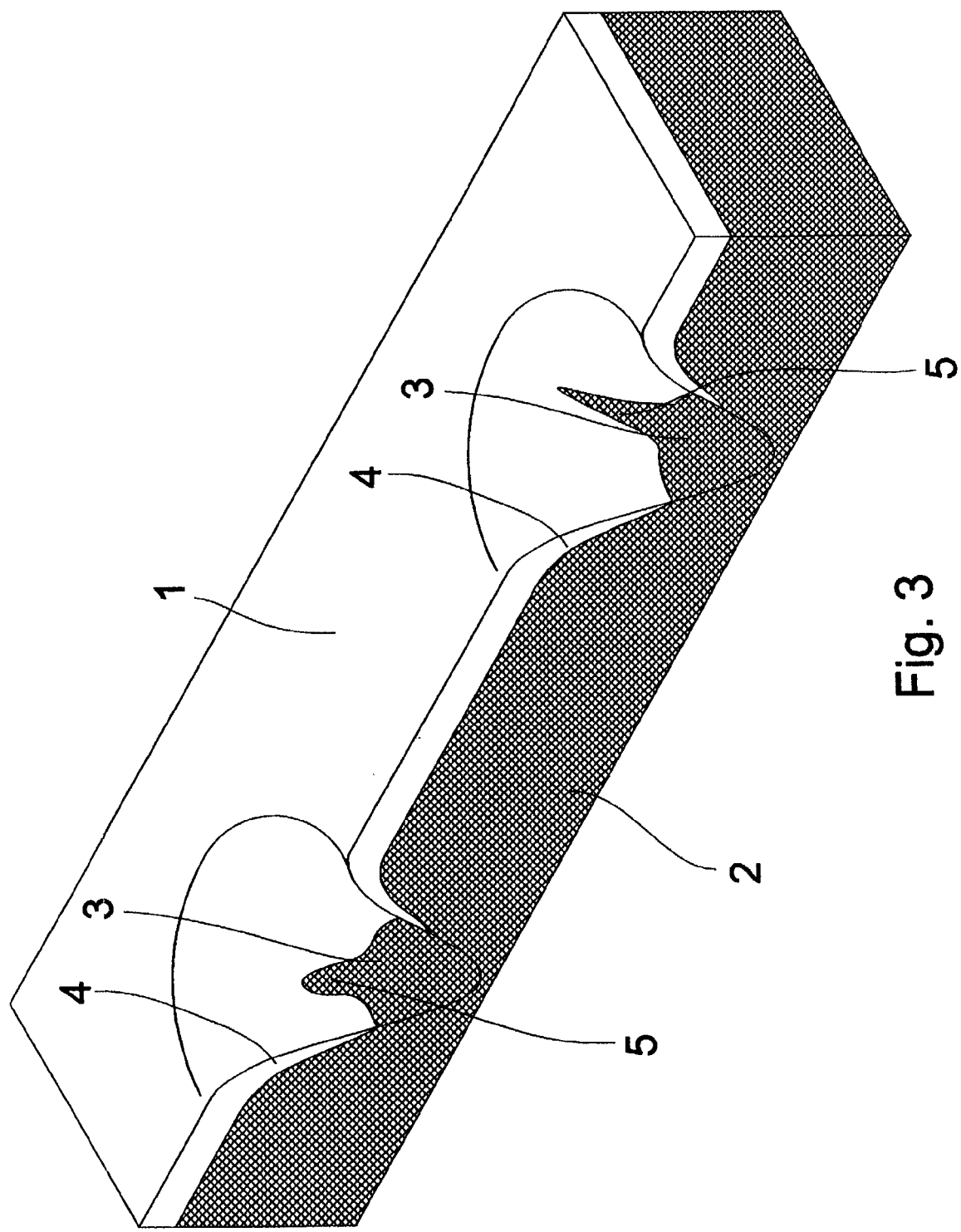

When using needles or blades for making the openings 3 in the material 1, different depths of indentation can be set, and in a first extreme case it can be set such that the penetrating material 1 is just perforated, however the materials 2 are not fully penetrated. As a result only narrow funnels 4 or lean shapes 7 are formed in the material 1, which leads to a lower gas permeability of the electrodes (cf. FIG. 3). A second extreme case is that the needle or blade completely perforates the porous materials 2, thereby creating broader funnels 4 or a broad line shape 7 in the material 1, which leads to a higher gas permeability of the electrodes (cf. FIG. 1). The fact that no material 2 is left directly below the openings 3 is of little importance since this material, even if it is present, offers only a very small gas diffusion resistance.

For the purpose of pre-setting or adjusting the gas permeability, it is, however, preferably not the size of the openings 3 that is varied, i.e. the diameter of the needles or the width of the blades or their depth of indentation but the density of the array of openings, i.e. the number of openings over a certain area of the electrode. By varying the form of the funnels 4 or shapes 7, respectively, of the openings 3 as little as possible and by changing rather their distance from each other, it is possible to better reproduce the gas permeability from the point of view of production.

Figure 4:
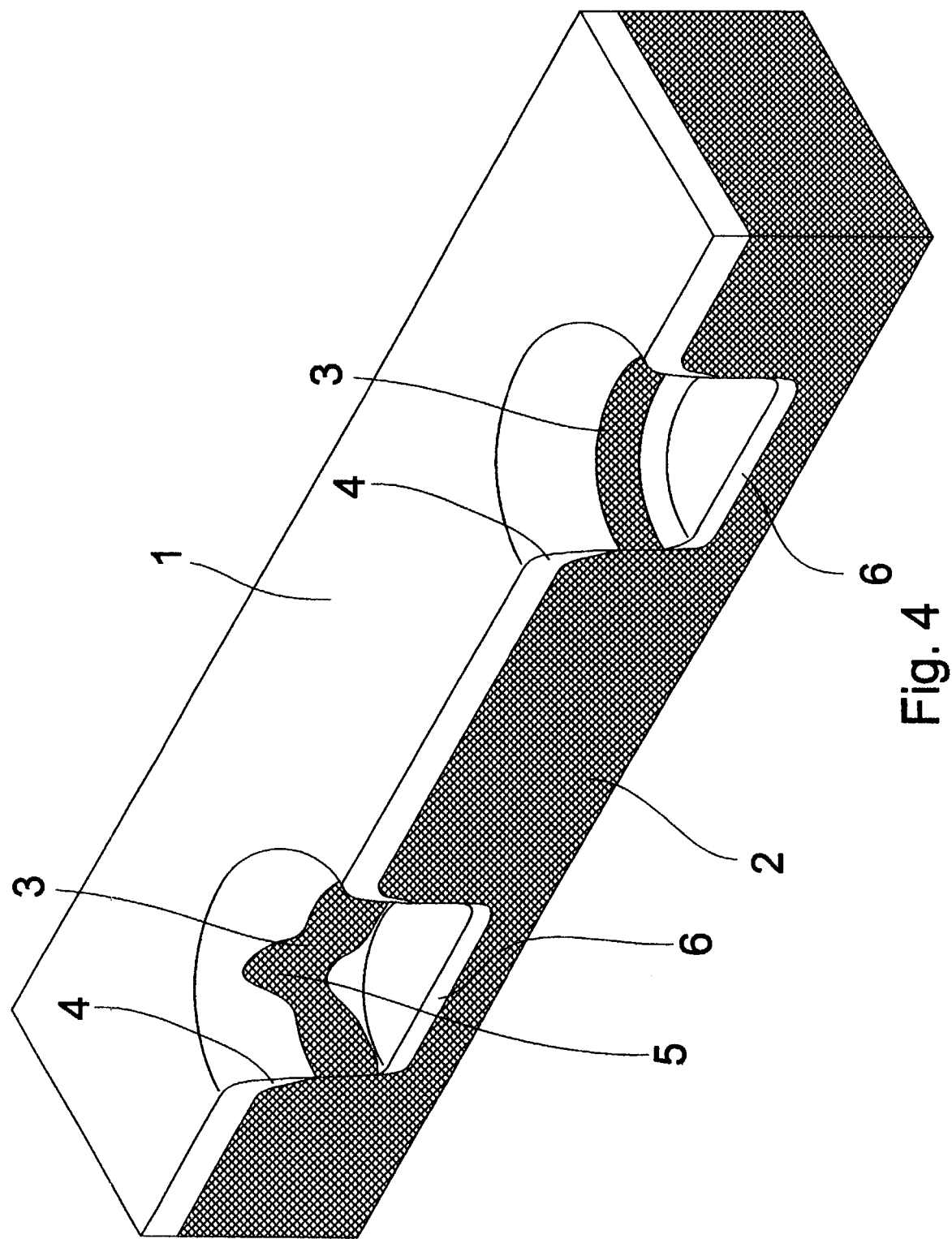
FIG. 4 is a perspective view of a part of a still further embodiment of the electrode, where separate parts of the lower permeability material form islands in the higher permeability materials.

In a further preferred embodiment of the invention relatively blunt pins or metal platelets are used for making the openings 3 in the material 1. When using suitable thin materials 1 and by suitably adjusting the depth of indentation, this results in small parts 6 of the penetrating material 1 which parts more or less correspond to the cross section of the pins or platelets being split off from the material 1 and being pressed into the materials 2 below (cf. FIG. 4). This is advantageous, for example, for the cathode of a fuel cell. The product water produced at the cathode of the fuel cell is taken up more rapidly by the reaction air flow at those parts of the membrane which are located opposite of one of the openings 3 of the electrode without these parts 6 than by other areas. This results in a higher danger of dehydration of the membrane in those areas. Due to the parts 6 of the intruding material 1 pressed into the porous materials 2 below the openings 3, the product water cannot undisturbedly evaporate into the reaction air flow through these openings but at first has to diffuse around these parts 6. Thus, a more constant moistening of the membrane is ensured.

The materials 1 and 2 can be mechanically bonded to each other in various ways. At least one of the materials used can be put onto the other materials in the form of a disconnected raw material and these materials are pressed together. If expanded graphite is used as raw material for the material 1, for example flakes of the expanded graphite can be deposited onto the material 2 which preferably is a carbon fiber material, and can be pressed onto this material to form a closed graphite layer on its surface. By the interlocking of the graphite particles with the carbon fiber material this layer adheres to the latter even without the openings 3. Afterwards, any kind of the openings 3 can be prepared in this graphite layer.

The respective materials can also be present in the form of layer materials, e.g. films of pressed expanded graphite or thin metal foils on the one hand and layers of carbon fiber material on the other hand. As has already been described, these layers are simply laid one upon the other, and by producing the openings 3 a mechanical bond is formed.

In a further embodiment the materials can be bonded to each other by a suitable bonding agent before the openings 3 are formed. Preferably, curable resins such as epoxy resin, or thermoplasts such as polyethylene or fluorinated thermoplasts are used. Thus, an increased mechanical stability of the electrode, which is sometimes necessary, can be achieved.

EXAMPLE 1

In a preferred embodiment, material 1 is a film of pressed expanded graphite wherein the openings 3 are formed by means of needles. They perforate the graphite film from the side located away from material 2 which is a carbon fiber material. The depth of indentation of the needles is chosen such that the they completely perforate the carbon fiber material 2, wherein in the production process the tips of the needles perforate the material up to a depth of approximately 1 mm below the electrode. For this purpose, the carbon fiber material 2 and the graphite layer material 1 above it are positioned on a support which can also be perforated, e.g. on paper.

In particular, for the material 1 a pressed graphite film KU-CB 7,5 of expanded graphite produced by Kunze with a thickness of 75 µm is used. The carbon fiber material 2 is a carbon fiber paper GDL 10-P produced by SGL Carbon AG, impregnated with a PTFE solution and having a thickness of 350 µm. The graphite film is put onto the carbon fiber paper without a bonding agent. By means of suitable needles, graphite funnels 4 with a depth of 250 to 300 µm are formed. These interlock in the carbon fiber paper, which leads to a mechanical bond between the graphite layer and the carbon fiber paper. The largest diameter of the graphite funnels 4 prepared is about 500 µm.

The openings 3 are pricked into the graphite film with the help of a tool mounted on a milling machine. This tool has a plurality of needles so that the openings required for making the electrode can be produced in only one or few steps. If the graphite film and the carbon fiber paper lift from the support, the tapered needles would perforate the graphite film up to a larger needle diameter thus creating a larger graphite funnel 4. To avoid this, the graphite film and the carbon fiber paper are sucked by a sucking device through a porous support so as to control the size of the graphite funnels 4 produced as precisely as possible.

When using the so produced electrodes in PEM fuel cells a rather soft carbon fleece can be laminated between the electrode and the membrane which can be impregnated with soot, graphite and a PTFE binder in order to increase the conductivity. Thus, the danger is avoided of the stiff fibers of the carbon fiber paper used damaging the membrane when they come into contact with each other.

EXAMPLE 2

In a further embodiment of the invention the same materials are used as in Example 1 and the graphite film is glued onto the carbon fiber paper. For this purpose, a suspension of the partially fluorinated plastic THV 530 produced by Dyneon is mixed with isopropanol in a volume ratio of 1:5. This bonding agent is deposited on the graphite film in a suitable manner. After the deposition on the carbon fiber paper the materials are heated to a temperature above the melting point of the partially fluorinated plastic material, preferably higher than 250° C., and exposed to a slight pressure of approx. 1 bar. Thus, first a bond is achieved between the graphite film and the carbon fiber paper which is then strengthened by means of the openings 3 which are prepared in the graphite layer as has been shown in Example 1.

EXAMPLE 3

Instead of the needles used in Example 1, in this example almost cylindrical pins, which are blunt in particular at their ends, are used for forming the openings 3 in the layer of the graphite film material 1. The diameters of these pins can be between 0.3 and 0.8 mm. Thus, as has been described above with reference to FIG. 4, the small parts 6 are split off from of the graphite film material 1 and pressed into the carbon fiber paper material 2 below. Besides, the electrode is made as in Example 1 with the exception of the depth of indentation of the pins which has to be chosen such that the parts 6 of the graphite film material 1 are not pressed right through the carbon fiber paper material 2 into the support.

The invention claimed is:

1. Electrode for an electrochemical cell, the electrode comprising a flat laminate of two parallel adjacent layers each comprising first and second electrically conducting materials, respectively, the material(s) of one layer being different from the material(s) of the other layer, the at least two materials of the two layers having different gas permeabilities and being bonded to each other, wherein the first layer of the first material(s) having a lower gas permeability exhibits openings which penetrate into the other layer of the second material(s) having a higher gas permeability, and the first material extends along the inner wall surfaces of the openings to some extent into the second layer, wherein the first material is pressed expanded graphite or a metal and the second material consists of carbon fiber materials.

2. Electrode according to claim 1, wherein by the penetration of the first material(s) into the second material(s) an interlocking between all these materials occurs which leads to a mechanical bond between the materials.

3. Electrode according to claim 1, wherein it exhibits a geometric distribution and number of openings over the surface of the electrode, which distribution and number result in the degree of gas permeability of the electrode required for the electrochemical cell.

4. Electrode according to claim 1, wherein the openings are more or less funnel-shaped, tapering from the first toward the second layer.

5. Electrode according to claim 1, wherein the openings are arranged as longitudinal ditches the side walls of which taper from the first toward the second layer.

6. Electrode according to claim 1, wherein the materials are susceptible to be mechanically shaped.

7. Method of producing the electrodes according to claim 1, starting out from a laminate of first and second layers of the first material(s) and the second material(s), respectively, wherein a mechanical pressure is exerted onto spots of the layer of the first material(s) from its side located away from the second material(s) so that the first material(s) tear(s) at the locations of the spots to create indentations which form openings passing through the layer of the first material(s) and penetrating into the layer of the second material(s), parts of the torn first material(s) being pressed into the layer of the second material(s) and adhered to the walls of the openings.

8. Method according to claim 7, wherein a mechanical bond between the first layer and the second layer is produced by the creation of the openings and the penetration of the first material(s) into the layer of the second material(s).

9. Electrode for an electrochemical cell, the electrode comprising a flat laminate of two parallel adjacent layers each comprising first and second electrically conducting materials, respectively, the material(s) of one layer being different from the material(s) of the other layer, the at least two materials of the two layers having different gas permeabilities and being bonded to each other, wherein the first layer of the first material(s) having a lower gas permeability exhibits openings which penetrate into the other layer of the second material(s) having a higher gas permeability, and the first material extends along the inner wall surfaces of the openings to some extent into the second layer, wherein split-off parts of the material(s) are located in the openings within the layer of the second material(s), wherein the thickness of the layers is greater than the depth of the openings.

10. Electrode for an electrochemical cell, the electrode comprising a flat laminate of two parallel adjacent layers each comprising first and second electrically conducting materials, respectively, the material(s) of one layer being different from the material(s) of the other layer, the at least two materials of the two layers having different gas permeabilities and being bonded to each other, wherein the first layer of the first material(s) having a lower gas permeability exhibits openings which penetrate into the other layer of the second material(s) having a higher gas permeability, and the first material extends along the inner wall surfaces of the openings to some extent into the second layer, wherein split-off parts of the material(s) are located in the openings within the layer of the second material(s), wherein the first material is pressed expanded graphite or a metal and the second material consists of carbon fiber materials.

* * * * *